(12) United States Patent
Sanada

(10) Patent No.: US 7,696,951 B2
(45) Date of Patent: Apr. 13, 2010

(54) LEFT-HANDED MEDIUM USING NO VIA

(75) Inventor: Atsushi Sanada, Ube (JP)

(73) Assignee: National University Corporation Yamaguchi University, Yamaguchi-shi (JP)

( * ) Notice: Subject to any disclaimer, the term of this patent is extended or adjusted under 35 U.S.C. 154(b) by 396 days.

(21) Appl. No.: 11/817,549

(22) PCT Filed: Feb. 27, 2006

(86) PCT No.: PCT/JP2006/304184

§ 371 (c)(1),
(2), (4) Date: Aug. 31, 2007

(87) PCT Pub. No.: WO2006/093301

PCT Pub. Date: Sep. 8, 2006

(65) Prior Publication Data

US 2009/0179823 A1 Jul. 16, 2009

(30) Foreign Application Priority Data

Mar. 3, 2005 (JP) ............................. 2005-058443

(51) Int. Cl.
*H01Q 15/02* (2006.01)
(52) U.S. Cl. ................... 343/909; 343/700 MS
(58) Field of Classification Search .......... 343/700 MS, 343/756, 846, 909, 911 R; 333/116, 156, 333/219
See application file for complete search history.

(56) References Cited

U.S. PATENT DOCUMENTS

| | | | | |
|---|---|---|---|---|
| 6,791,432 B2* | 9/2004 | Smith et al. | ................ | 333/99 S |
| 6,859,114 B2* | 2/2005 | Eleftheriades et al. | ...... | 333/156 |
| 7,256,753 B2* | 8/2007 | Werner et al. | ................ | 343/909 |
| 2003/0142036 A1* | 7/2003 | Wilhelm et al. | ............. | 343/909 |
| 2004/0263420 A1* | 12/2004 | Werner et al. | ................ | 343/909 |
| 2006/0152430 A1* | 7/2006 | Seddon et al. | .............. | 343/909 |

FOREIGN PATENT DOCUMENTS

JP 2002-510886 A 4/2002

(Continued)

OTHER PUBLICATIONS

D. R. Smith, et al, "Composite Medium with Simultaneously Negative Permeability and Permittivity" Phys. Rev. Lett., vol. 84, No. 18, pp. 4184-4187, May 2000.

(Continued)

*Primary Examiner*—Hoang V Nguyen
(74) *Attorney, Agent, or Firm*—Antonelli, Terry, Stout & Kraus, LLP.

(57) ABSTRACT

A two-dimensional structure medium comprising a conductor pattern as unit cells formed on the upper surface of a substrate and a conductor pattern formed on the lower surface of the substrate and exhibiting a left-handed characteristic achieved without using a via by utilizing the interaction between an inductance component formed by connecting a part of a floating island pattern out of the conductor pattern on the lower surface of the substrate with a pattern as the ground portion and a capacitance component of parallel-plate mode formed by the conductor pattern on the upper surface of the substrate and the conductor pattern on the lower surface of the substrate.

5 Claims, 13 Drawing Sheets

FOREIGN PATENT DOCUMENTS

| | | |
|---|---|---|
| JP | 2002-204123 A | 7/2002 |
| JP | 2005-020266 | 1/2005 |
| WO | WO 99/50929 A1 | 10/1999 |
| WO | WO 2004/025783 A1 | 3/2004 |

OTHER PUBLICATIONS

C. Caloz et al, Application of the Transmission Line Theory of Left-handed (LH) Materials to the Realization of a Microstrip "LH Line", IEEE-APS Int'l. Symp. Digest, vol. 2, pp. 412-415, Jun. 2002.

A. Grbic et al, "Experimental Verification of Backward-wave Radiation from a Negative Refractive Index Metamaterial", Journal of Applied Physics, vol. 92, No. 10, pp. 5930-5935, Nov. 2002.

George V. Eleftheriades, et al, "Planar Negative Refractive Index Media Using Periodically L-C Loaded Transmission Lines", IEEE Transactions on Microwave Theory and Techniques, vol. 50, No. 12, pp. 2702-2712, Dec. 2002.

Atsushi Sanada, et al, "Planar Distributed Structures With Negative Refractive Index", IEEE Trans. On Microwave Theory and Techniques, vol. 52, No. 4, pp. 1252-1263, Apr. 2004.

Atsushi Sanada, et al, "A Via-Free Microstrip Left-Handed Transmission Line", IEEE International Microwave Symposium Digest, pp. 301-304, Fort Worth, Jun. 2004.

Ashwin K. Iyer et al, "Negative Refractive Index MetaMaterials Supporting 2-D Waves", the Edward S. Rogers Sr. Department of Electrical & Computer Engineering, University of Toronto, Ontario, M5S 3G4, Canada, WE4C-1, Aug. 2002 IEEE MTT-S CDROM, pp. 1067-1070.

* cited by examiner

BRILLOUIN ZONE

LEFT-HANDED MEDIUM USING NO VIA

This application is a 371 of PCT/JP2006/304184 dated Feb. 27, 2006.

TECHNICAL FIELD

The present invention relates to a left-handed medium, and particularly relates to a two-dimensional periodic structure medium with a left-handed characteristic achieved without using a via (through hole).

BACKGROUND ART

A medium having properties which do not exist in nature can be artificially structured by arraying small pieces of a metal, a dielectric substance, a magnetic material and a superconductive material at sufficiently shorter spacings than a wavelength (about one-tenth or less of wavelength). This medium is referred to as a metamaterial in the sense of being beyond media in nature. The properties of the metamaterial vary depending on shape, material property and arrangement of unit particles. In particular, a metamaterial having an equivalent dielectric constant $\in$ and a magnetic permeability $\mu$ simultaneously showing a negative value has been called a "left-handed medium (Left-Handed Materials)", because its electric field, magnetic field and wave vector form a left-handed system. In contrast to this, a normal medium having an equivalent dielectric constant $\in$ and a magnetic permeability $\mu$ simultaneously showing a positive value is referred to as a "right-handed medium (Right-Handed Materials)". In particular, the "left-handed medium" was predicted by a Russian physicist, Veselago in 1967 to have peculiar properties such as so-called a backward-wave which is a wave having a group velocity (propagation velocity of energy) having an opposite sign to a phase velocity (progression velocity of phase) and an amplification of an evanescent wave which exponentially decays in a nonpropagation region. A relational region of the dielectric constant $\in$, the magnetic permeability $\mu$ and the medium can be classified into the media of the first to fourth quadrants, according to positive and negative values of the dielectric constant $\in$ and positive and negative values of the magnetic permeability $\mu$, as shown in FIG. 1.

Some left-handed media have been conventionally invented, and representative media will now be exemplified below. For instance, a document according to D. R. Smith, W. J. Padilla, D. C. Vier, S. C. Nemat-Nasser, and S. Schultz, "Composite medium with simultaneously negative permeability and permittivity" Phys. Rev. Lett., vol. 84, no. 18, pp. 4184-4187, May 2000 (Document 1) describes a left-handed artificial medium which is composed of unit cells each consisting of a split-ring resonator and a wire resonator, and shows that the medium shows left-handed characteristics experimentally. The medium is referred to as a resonant type left-handed medium, because the structure uses the resonator. The medium shows an extremely large loss due to the resonance and an extremely narrow operational band, because the medium can work only in the vicinity of the resonance frequency of the split-ring resonator and the wire resonator.

Among one-dimensional nonresonant type left-handed media achieving left-handed characteristics without using a resonator, a medium using a microstrip line is described in a document according to C. Caloz and T. Itoh, "Application of the transmission line theory of left-handed (LH) materials to the realization of a microstrip LH Line", IEEE-APS Int'l Symp. Digest, vol. 2, pp. 412-415, June 2002 (Document 2), or a medium having a one-dimensional structure based on a coplanar waveguide (Coplanar Waveguide: CPW) is described in a document according to A. Grbic and G. V. Eleftheriades, "Experimental verification of backward-wave radiation from a negative refractive Index metamaterial", Journal of Applied Physics, Vol. 92, No. 10, pp. 5930-5935, November 2002 (Document 3).

The medium based on the microstrip line achieves the left-handed characteristics from series capacitance between adjacent metallic patterns of unit cells and parallel inductance generated from vias which connect the metallic patterns with a ground plane. However, the medium has had a difficulty in reducing the size of unit cells and integrating the unit cells because the density of the vias which penetrate a substrate is restricted from a production viewpoint. The medium also has had a problem of requiring a high manufacturing cost, because of needing not only to process a substrate surface solely, but also to prepare a metal which penetrates the substrate. On the other hand, the one-dimensional left-handed medium using the coplanar waveguide can obtain the parallel inductance even without using the via which penetrates the substrate because a ground conductor is arranged in the same plane as a signal metal, but it has been difficult to form a two-dimensional medium.

In addition, as for two-dimensional nonresonant type left-handed media, a medium composed of series capacitance and parallel inductance produced by using an LC lumped-parameter element is described in a document according to V. Eleftheriades, A. K. Iyer and P. C. Kremer, "Planar Negative Refractive Index Media Using Periodically L-C Loaded Transmission Lines", IEEE Transactions on Microwave Theory and Techniques, Vol. 50, No. 12, pp. 2702-2712, December 2002 (Document 4), and a distributed-constant-type medium composed of only a metallic pattern is described in a document according to Atsushi Sanada, Christophe Caloz and Tatsuo Itoh, "Planar Distributed Structures with Negative Refractive Index", IEEE Trans. on Microwave Theory and Techniques, Vol. 52, No. 4, pp. 1252-1263, April 2004 (Document 5). Any of the media uses an inductor chip or a via (through hole) which penetrate a substrate for forming the parallel inductance with respect to a ground plane, and accordingly has the above described problems.

A medium has been known which uses a one-dimensional line devised so as to possess a left-handed characteristic without using a via. The medium has a structure of connecting parallel inductance with a large-area metallic patch having a large ground capacitance, instead of directly connecting with a ground plane of a rear surface of a substrate through the via, and has been well known as described in a document, for instance, according to Atsushi Sanada, Koichi Murakami, Shuji Aso, Hiroshi Kubo, and Ikuo Awai, "A via-free microstrip left-handed transmission line", IEEE International Microwave Symposium Digest, pp. 301-304, Fort Worth, June 2004 (Document 6). However, the structure is not suitable for integration because of requiring a large-area metallic patch. In addition, the structure has not been extended to a two-dimensional medium.

As described above, a conventional medium needs to prepare a via (through hole) which penetrates a substrate and connects the upper surface of a substrate with a ground plane to form an inductance, and accordingly has had a difficulty in integrating unit cells because an upper limit of the density of the via is limited. The conventional medium also has had a problem of requiring a high manufacturing cost, because of needing not only to process a substrate surface solely, but also to prepare a metal which penetrates the substrate.

DISCLOSURE OF THE INVENTION

For this reason, an object of the present invention is to realize a two-dimensional periodic structure medium with a left-handed characteristic, by realizing an electrically-equivalent parallel inductance through combining a conductor pattern formed on the upper surface of a substrate with a conductor pattern formed on the ground plane, without using a via which directly connects the surface of the substrate to the ground plane that is the rear surface of the substrate.

In order to achieve the above described object, a left-handed medium using no via according to a featured invention of the present application includes a substrate having a conductor pattern of a plurality of unit cells formed on the upper surface and having a conductor pattern formed on the lower surface as a ground plane, wherein the conductor pattern on the upper surface of the substrate and the conductor pattern of the ground plane form capacitance in between the conductor patterns, and a part of the conductor pattern of the ground plane and a ground portion of the ground plane form an electrically-equivalent parallel inductance.

A second invention of the present application is a left-handed medium using no via, having a structure in which an upper-surface substrate having a conductor pattern of a plurality of unit cells formed on the upper surface of the substrate and a ground plane having a conductor pattern formed thereon are arranged in an upper side and a lower side with a space, wherein the conductor pattern of the upper-surface substrate and the conductor pattern of the ground plane form capacitance in between the conductor patterns, and a part of the conductor pattern of the ground plane and a ground portion of the ground plane form an electrically-equivalent parallel inductance, characterized in that the conductor pattern of the unit cells on the upper surface of the substrate is formed of a rectangular metal patch, and the conductor pattern of the ground plane, which faces to the conductor pattern of the unit cells on the upper surface of the substrate, is formed of four triangular metal patches combined so that each triangular metal patch having two sides separated by a ground region and the other side connected to a conductor is arranged so as to face each other at each vertex formed by the two sides which are separated by the ground region.

A third invention of the present application is a left-handed medium using no via, having a structure in which an upper-surface substrate having a conductor pattern of a plurality of unit cells formed on the upper surface of the substrate and a ground plane having a conductor pattern formed thereon are arranged in an upper side and a lower side with a space, wherein the conductor pattern of the upper-surface substrate and the conductor pattern of the ground plane form capacitance in between the conductor patterns, and a part of the conductor pattern of the ground plane and a ground portion of the ground plane form an electrically-equivalent parallel inductance, characterized in that the conductor pattern of the unit cells on the upper surface of the substrate is formed of a rhombic metal patch, and the conductor pattern of the ground plane, which faces to the conductor pattern of the unit cells on the upper surface of the substrate, is formed of four triangular metal patches combined so that each triangular metal patch having a long side separated by a ground region and a vertex formed by the other two sides connected to a conductor is arranged so as to face each other at each vertex.

A fourth invention of the present application is a left-handed medium using no via according to the second invention or the third invention, characterized in that the conductor pattern of the upper-surface substrate and the conductor pattern of the ground plane form the capacitance in between the conductor patterns, and a part of the conductor pattern of the ground plane, which faces the brim of the conductor pattern of the upper-surface substrate, and a ground portion of the ground plane form an electrically-equivalent parallel inductance.

ADVANTAGES OF THE INVENTION

As described above, a left-handed medium using no via according to the present invention shows such an effect as will be described below. Specifically, the left-handed medium according to the present invention can remarkably increase an integration degree of unit cells by giving scalability to the structure beyond the limitation of via density, because an operating frequency of the present medium can be freely varied by upsizing or downsizing the structure according to a scaling law. In addition, the left-handed medium can reduce a manufacturing cost, because the left-handed medium needs no via and a process for producing the via can be consequently omitted.

BEST MODE FOR CARRYING OUT THE INVENTION

A left-handed medium according to the present invention has a structure in which a via is not provided between a conductor pattern on an upper surface and a ground plane of an upper-surface substrate, and the upper-surface substrate having a conductor pattern of a plurality of unit cells formed on the upper surface of the substrate and the ground plane having a conductor pattern formed thereon are arranged in an upper side and a lower side with a space; and is characterized in that the conductor pattern of the upper-surface substrate and the conductor pattern of the ground plane form capacitance in between the conductor patterns, and a part of the conductor pattern of the ground plane and a ground portion of the ground plane form an electrically-equivalent parallel inductance. Embodiments according to the present invention will now be described in detail with reference to the drawings.

First Embodiment

Figure 1:
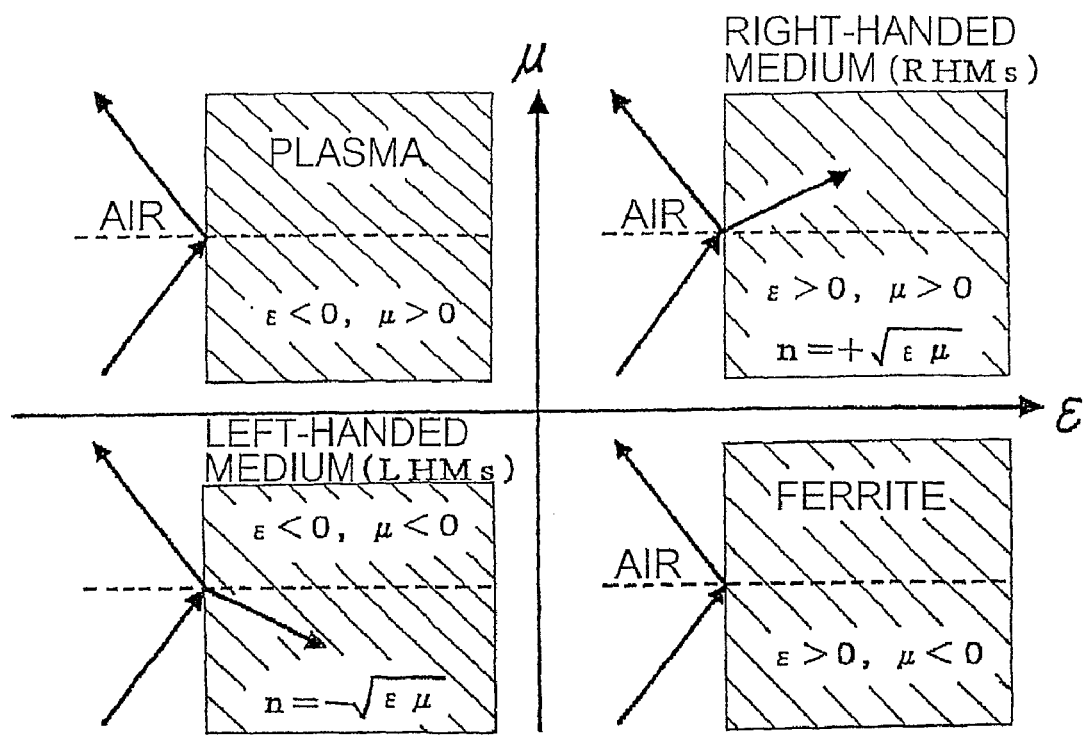
FIG. 1 is a view showing relational regions according to a dielectric constant $\in$, a magnetic permeability $\mu$ and a medium.
Figure 2:
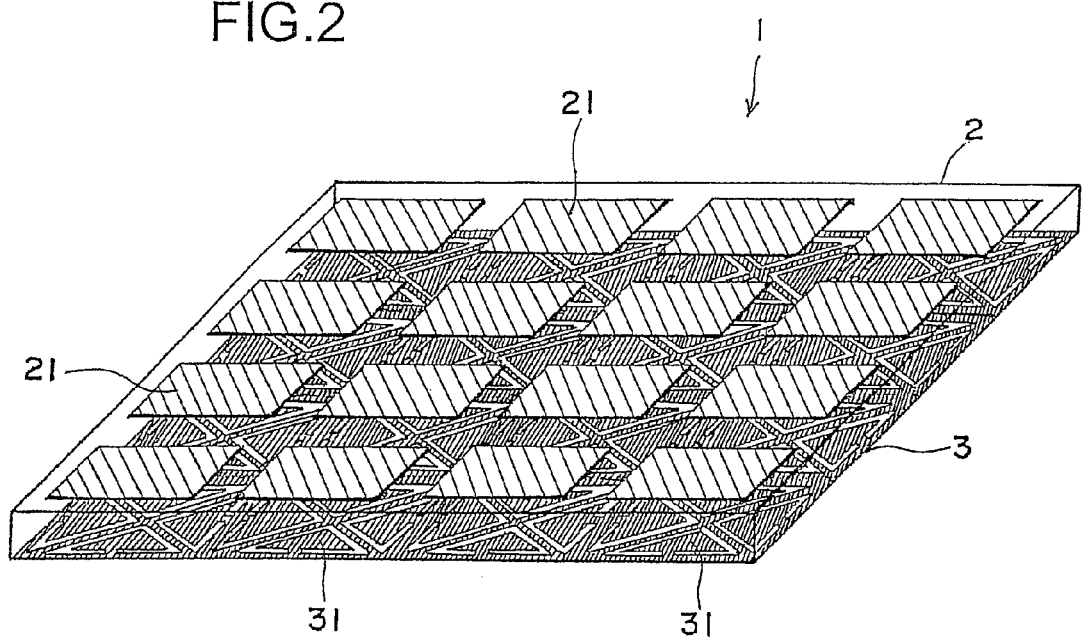
FIG. 2 is a schematic view of a first embodiment of a left-handed medium according to the present invention.
Figure 3:
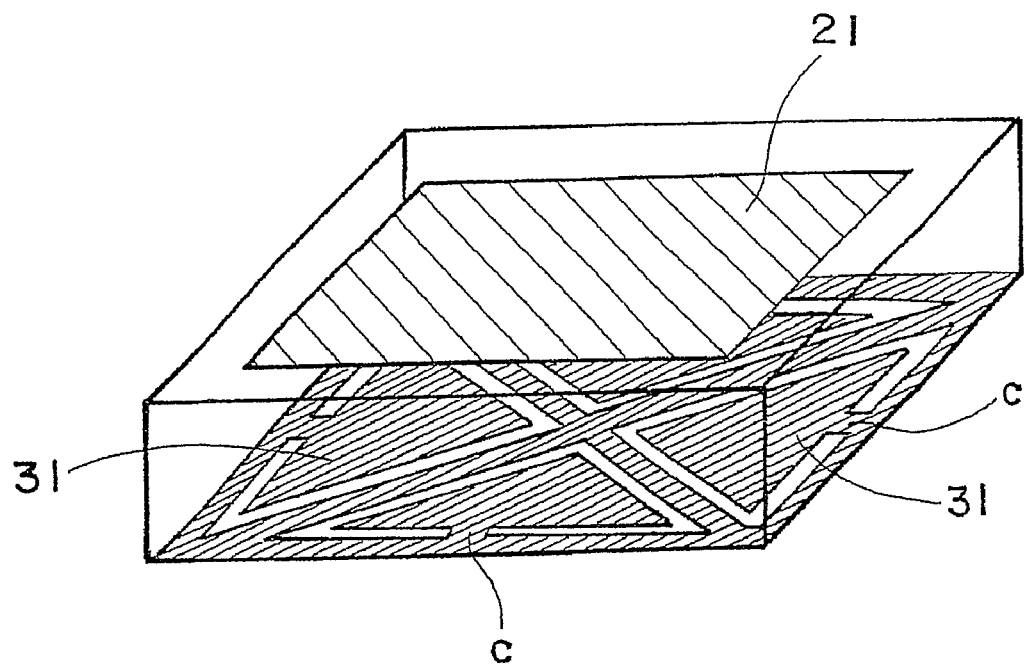
FIG. 3 shows a unit cell structure of a left-handed medium according to a first embodiment of the present invention.

FIG. 2 shows a schematic view of a first embodiment of a left-handed medium using no via according to the present invention. Reference numeral 1 denotes the left-handed medium that has a periodic structure in which an upper-surface substrate 2 having a conductor pattern 21 composed of a plurality of unit cells and a ground plane 3 having a plurality of conductor patterns 31 formed thereon are arranged in an upper side and a lower side with a space. FIG. 3 illustrates a structure of the unit cell of the left-handed medium 1. The conductor pattern 21 of the upper-surface substrate 2 and the conductor pattern 31 on the ground plane 3 are placed so as to face each other.

Figure 4:
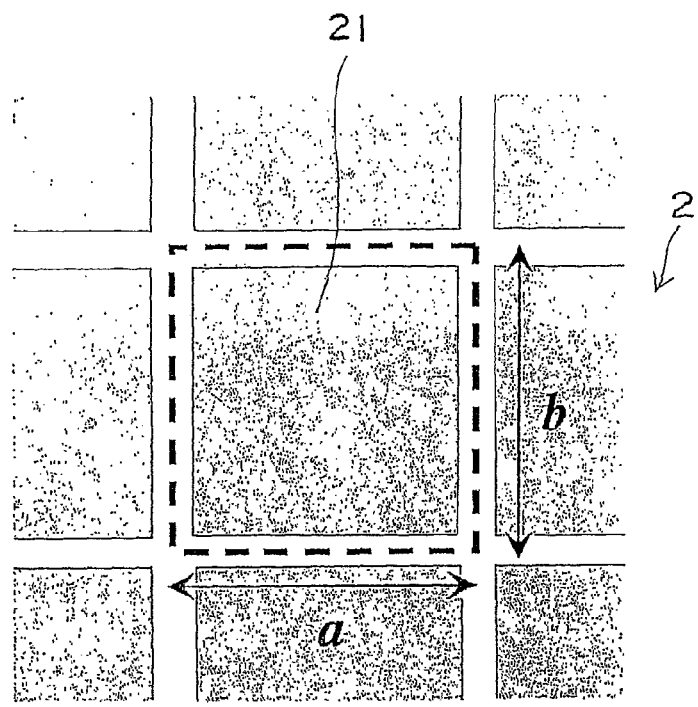
FIG. 4 shows a surface pattern of an upper-surface substrate of a left-handed medium according to a first embodiment.
Figure 5:
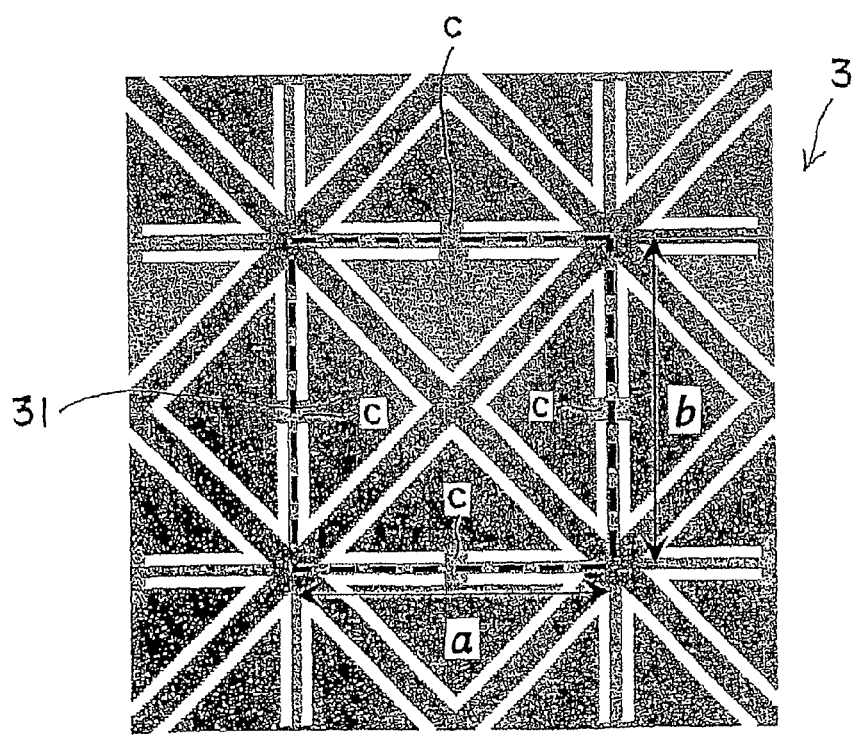
FIG. 5 shows a pattern on the ground plane of an upper surface-substrate of a left-handed medium according to a first embodiment of the present invention.

FIG. 4 shows a surface pattern of an upper-surface substrate 2. A unit cell has a size of width (a) and length (b) shown by a dashed line, and a rectangular metal patch (gray portion) is formed on the surface of a dielectric substrate. On a ground plane 3 of a rear surface facing a conductor pattern 21 of the unit cells on the upper-surface substrate 2, a conductor pattern 31 of the ground plane is formed as shown in FIG. 5. The conductor pattern 31 is formed of four triangular metal patches (gray portion) combined so that each triangular metal patch having two sides separated by a ground region and a part (c) of the other side connected to a conductor is arranged so as to face each other at each vertex formed by the two sides which are separated by the ground region.

Figure 6A:
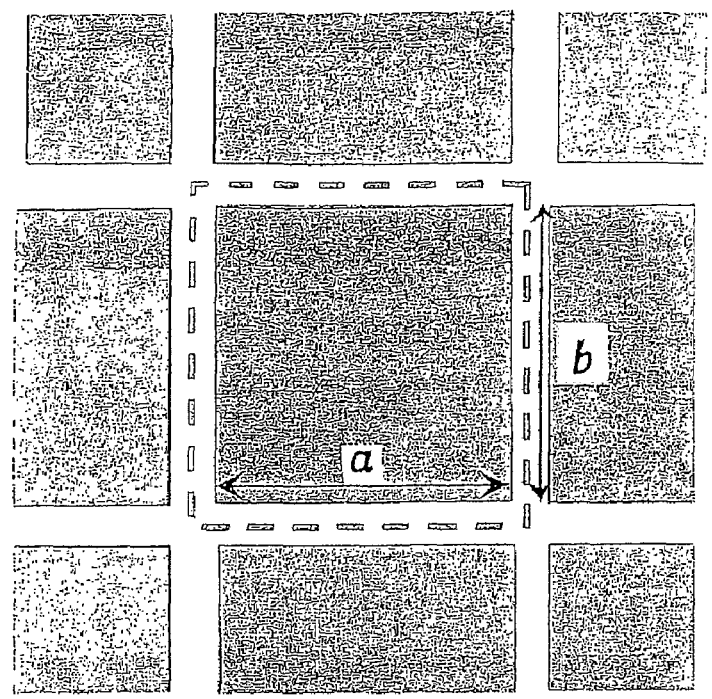
FIGS. 6(A) and 6(B) are views showing a conductor pattern in a unit cell and a conductor pattern of a ground plane on an upper-surface substrate, respectively, according to a first embodiment of the present invention.
Figure 6B:
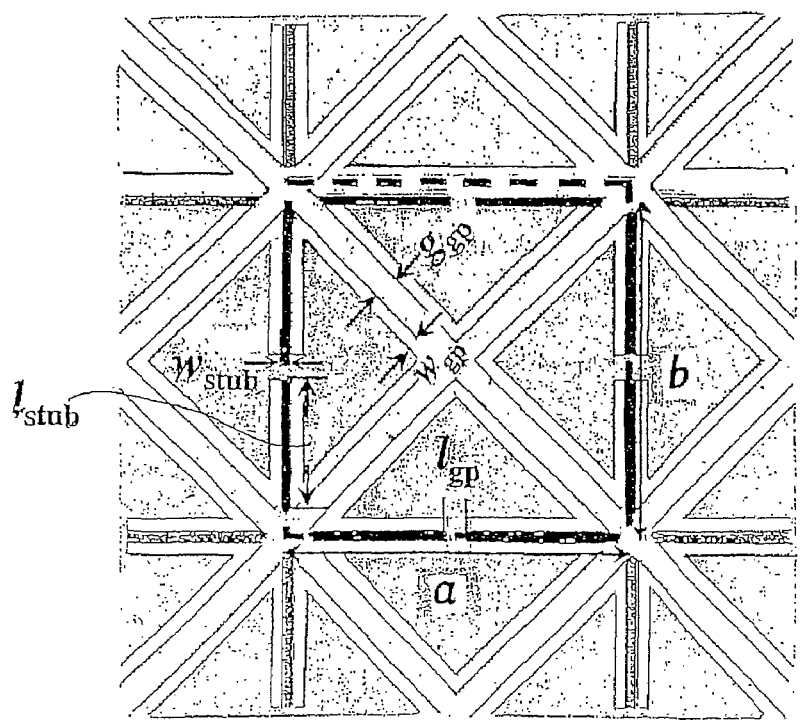

FIG. 6 sets FIG. 6 (A) and FIG. 6 (B). FIG. 6 (A) shows a conductor pattern of a unit cell of an upper-surface substrate 2, and FIG. 6 (B) shows a conductor pattern of a ground plane 3. FIG. 6 (B) particularly includes a parameter of each section. A vertical thin heavy line shows an electrically-equivalent parallel inductance which is formed when the upper-surface substrate 2 and the ground plane 3 are arranged in an upper side and a lower side with a space to compose a left-handed medium 1, and a part of the conductor pattern on the ground plane 3 is connected to a ground portion of the ground plane. Here, the electrically-equivalent parallel inductance is formed on a portion in the conductor pattern of the ground plane 3, which opposes to a brim of the conductor pattern of the upper-surface substrate 2.

Figure 7:
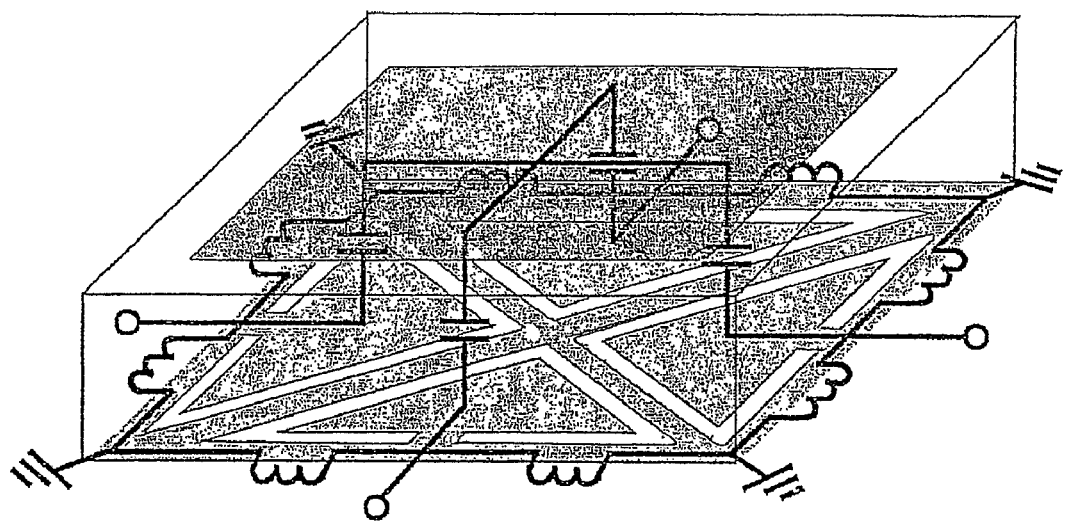
FIG. 7 shows a structure of an electrically equivalent circuit and a unit cell in a left-handed medium according to a first embodiment of the present invention.

In addition, capacitance is formed in between the conductor pattern 21 of the upper-surface substrate 2 and the conductor pattern 31 of the ground plane 3, and plays a role as a series capacitance in the medium. A left-handed medium in a first embodiment according to the present invention has the above described structure and an electrically equivalent circuit shown in the structure of the unit cell in FIG. 7. The structure shows a left-handed characteristic owing to an interaction between both the inductance and the capacitance.

Figure 8A:
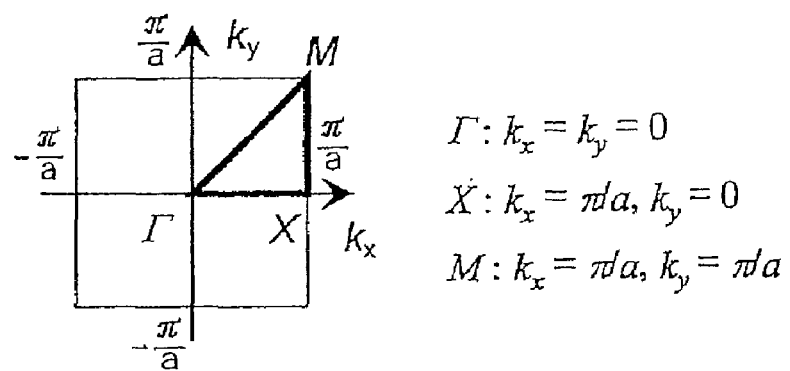
FIGS. 8(A) and 8(B) show a Brillouin zone and a simulation result of a dispersion characteristic, respectively, of a first embodiment according to the present invention.
Figure 8B:
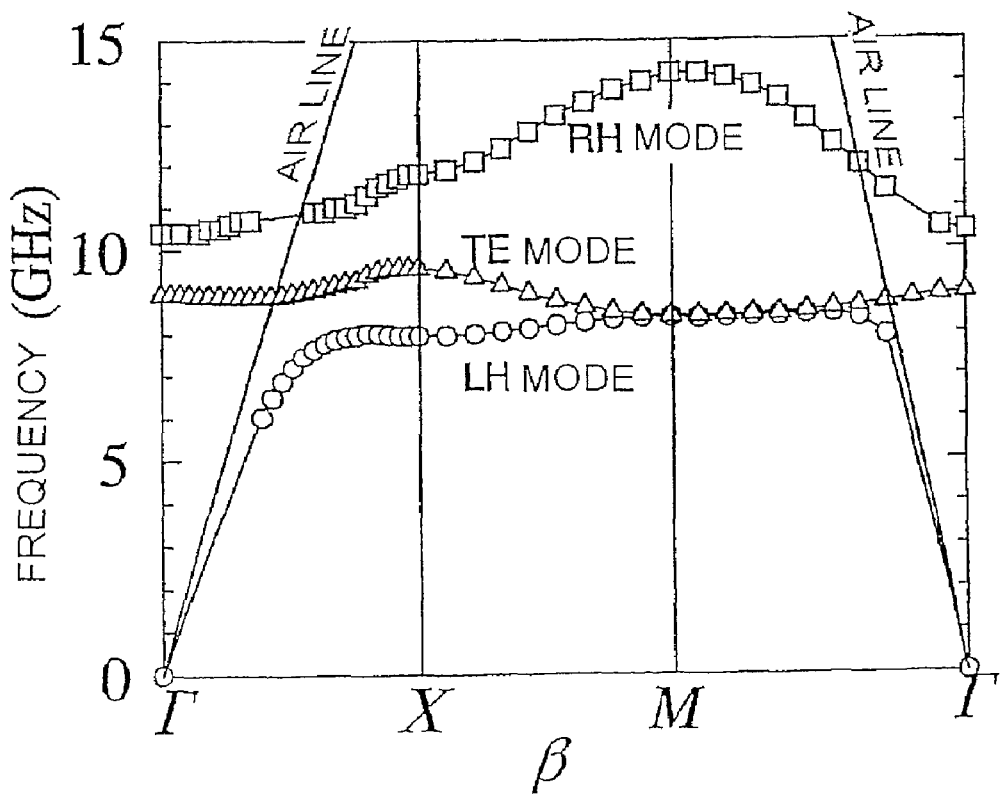

When considering a coordinate having $k_x$ ($=2\pi/\lambda_x$) and $k_y$ ($=2\pi/\lambda_y$) (where $\lambda_x$ and $\lambda_y$ are wavelengths in x direction and y direction respectively) with respect to a two-dimensional crystal in general, as shown in FIG. 8 (A), a rectangular plane formed by $-\pi/a \leq k_x \leq \pi/a$ and $-\pi/a \leq k_y \leq \pi/a$ is referred to as the first Brillouin zone.

Comparison between a theory of the dispersion characteristic and a numerical simulation for a three-dimensional electromagnetic field of the dispersion characteristic is described in detail in Document 5.

A dispersion characteristic on boundaries formed by connecting Γ, X and M points in a Brillouin zone was numerically simulated in a three-dimensional electromagnetic field on a value condition in Table 1 for parameters for each part in FIG. 6 (B). The result is shown in FIG. 8 (B). A horizontal axis represents the Γ, X and M points in the Brillouin zone, and a vertical axis represents a frequency. FIG. 8 (B) shows a relationship of a dispersion of a wave in a crystal (relationship between frequency f and wave number $\alpha=(k_x^2+k_y^2)^{1/2}$). A horizontal axis $\beta$ shows a value of wave number $\beta$ when $k_x$ and $k_y$ are varied such that $0 \leq k_x \leq \pi/a$ and $k_y=0$ in a range between Γ and X, $k_x=\pi/a$ and $0 \leq k_y \leq \pi/a$ in a range between X and M, and $0 \leq k_x=k_y \leq \pi/a$ in a range between M and M.

The dispersion relationship of the wave in the two-dimensional crystal is conventionally drawn on the $\beta$ axis.

A mode of transmitting a wave with the lowest frequency out of the modes is in a range between 7.96 GHz and 8.02 GHz, and an LH (left-handed medium) mode has a negative gradient in the range. The fact shows the existence of a backward-wave having a negative group velocity. In other words, the fact proves that the medium shows a left-handed characteristic.

TABLE 1

| | |
|---|---|
| a | 4.4 mm |
| b | 5.0 mm |
| $w_{stub}$ | 0.2 mm |
| $l_{stub}$ | 2.0 mm |
| $w_{gp}$ | 0.2 mm |
| $l_{gp}$ | 0.4 mm |
| $g_{gp}$ | 0.4 mm |

Thus, the left-handed medium using no via according to the present invention can remarkably increase an integration degree of unit cells by giving scalability to the structure beyond the limitation of via density, because an operating frequency of the present medium can be freely varied by upsizing or downsizing the structure according to a scaling law. In addition, the left-handed medium has a merit of being capable of reducing a manufacturing cost, because the left-handed medium needs no via and a process for producing the via can be consequently omitted.

Second Embodiment

Figure 9:
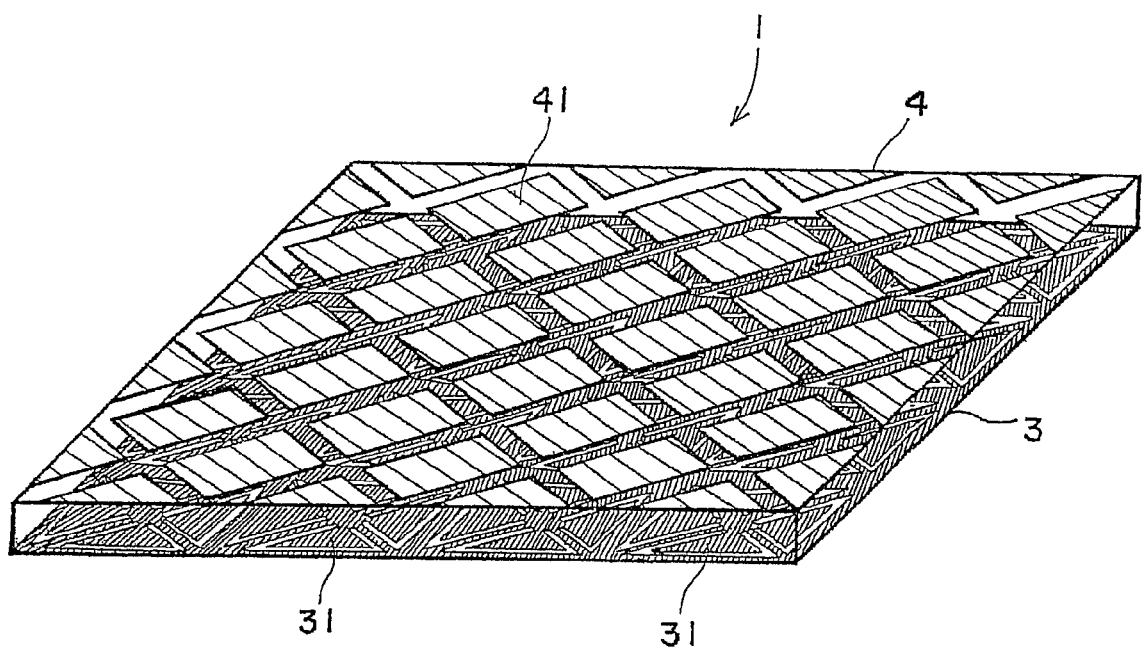
FIG. 9 is a schematic view of a second embodiment of a left-handed medium according to the present invention.
Figure 10:
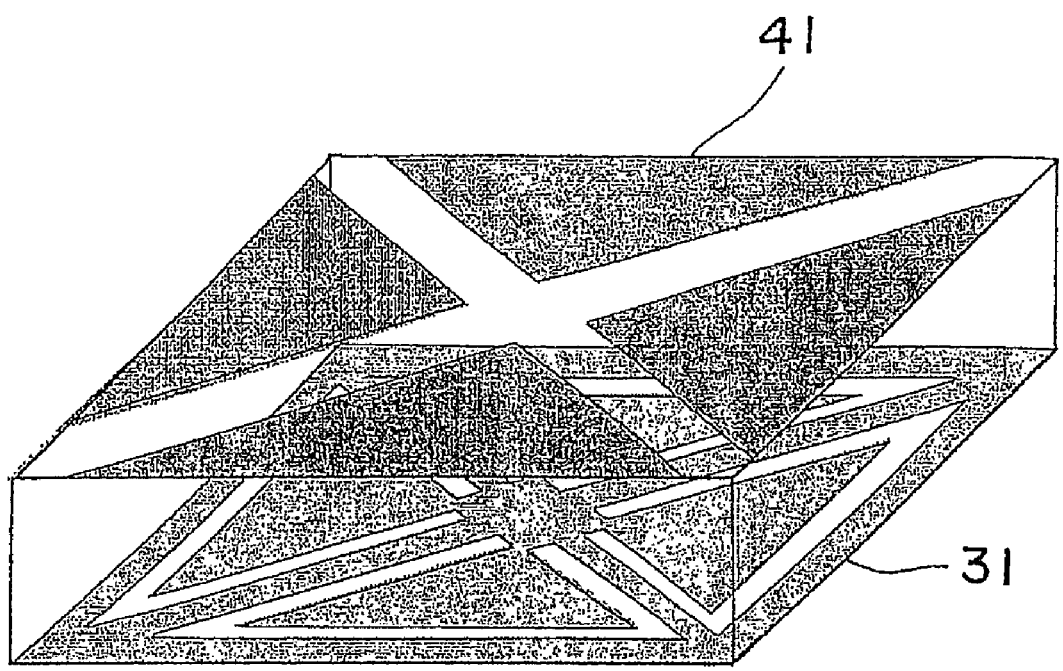
FIG. 10 shows a unit cell structure of a left-handed medium according to a second embodiment of the present invention.

Another embodiment will now be described. FIG. 9 shows a schematic view of a second embodiment of a left-handed medium using no via according to the present invention. Reference numeral 1 denotes the left-handed medium that has a periodic structure in which an upper-surface substrate 4 having a conductor pattern 41 composed of a plurality of unit cells and a ground plane 3 having a plurality of conductor patterns 31 formed thereon are arranged in an upper side and a lower side with a space. FIG. 10 illustrates a structure of the unit cell of the left-handed medium 1. The conductor pattern 41 of the upper-surface substrate 4 and the conductor pattern 31 on the ground plane 3 are placed so as to face each other.

Figure 11:
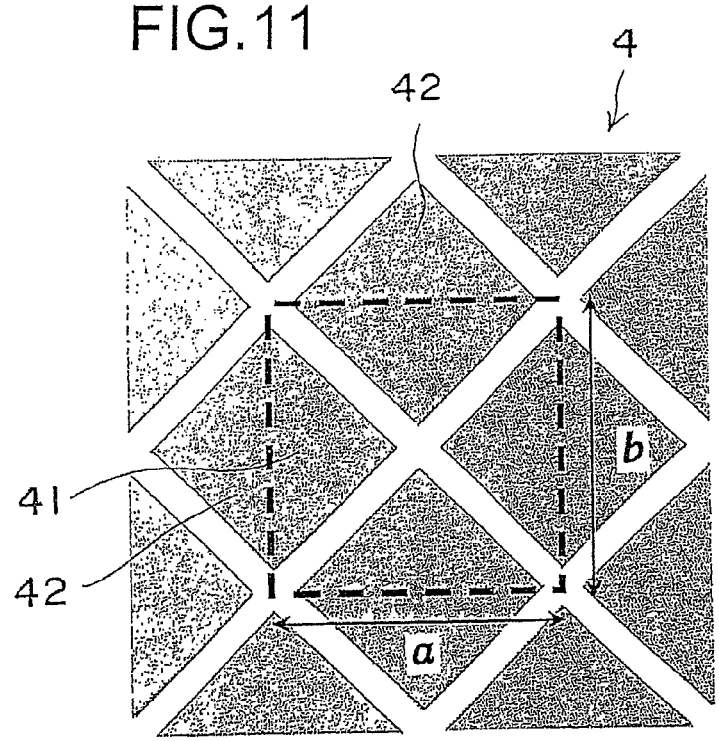
FIG. 11 shows a surface pattern of an upper-surface substrate of a left-handed medium according to a second embodiment of the present invention.
Figure 12:
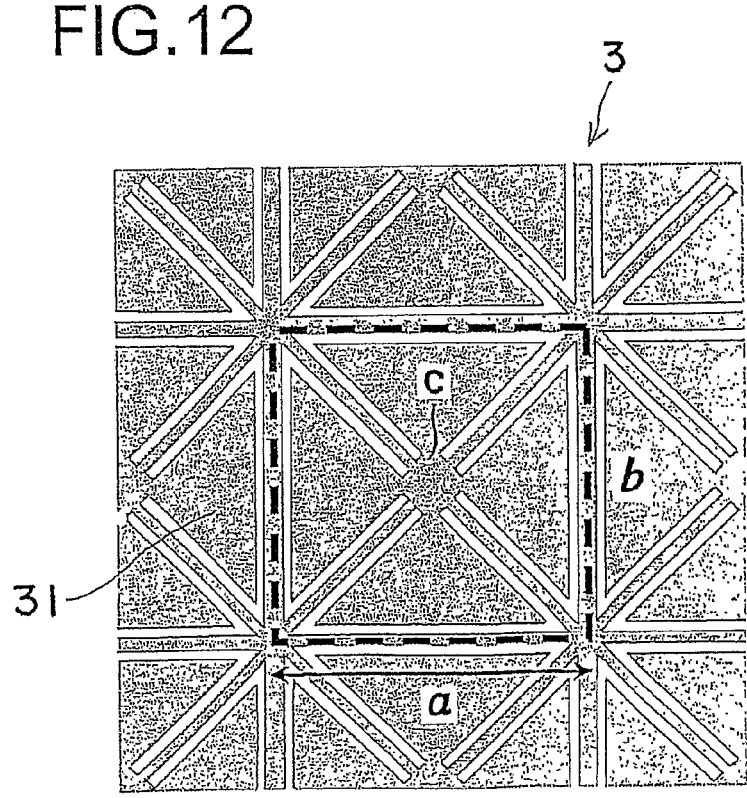
FIG. 12 shows a pattern on a ground plane of an upper-surface substrate of a left-handed medium according to a second embodiment of the present invention.

FIG. 11 shows a surface pattern of an upper-surface substrate 4. A unit cell 41 has a size of width (a) and length (b) shown by a dashed line, and a rhombic metal patch 42 (gray portion) is formed on the surface of a dielectric substrate. On a ground plane 3 of a rear surface facing a conductor pattern included in unit cells 41 on the upper-surface substrate 4, a conductor pattern 31 of the ground plane is formed as shown in FIG. 12. The conductor pattern 31 is formed of four triangular metal patches combined so that each triangular metal patch having a long side separated by a ground region and a vertex (c) formed by the other two sides connected to a conductor is arranged so as to face each other at each vertex.

Figure 13A:
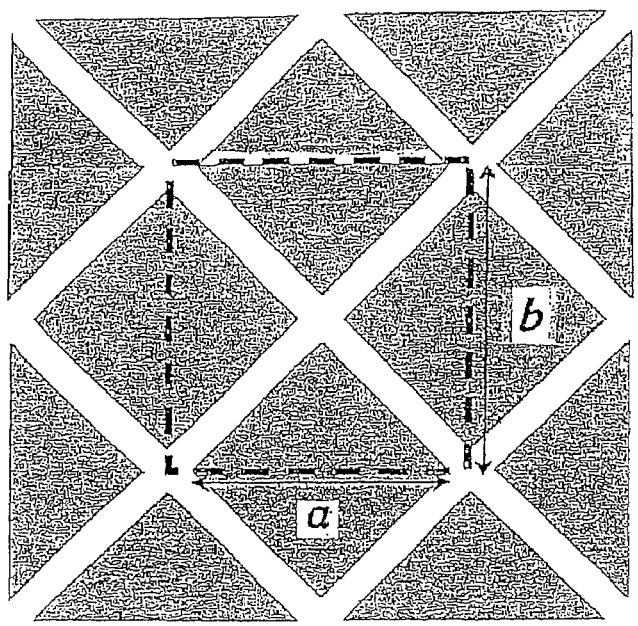
FIGS. 13(A) and 13(B) are views showing a conductor pattern in a unit cell and a conductor pattern of a ground plane on an upper-surface substrate, respectively, according to a second embodiment of the present invention.
Figure 13B:
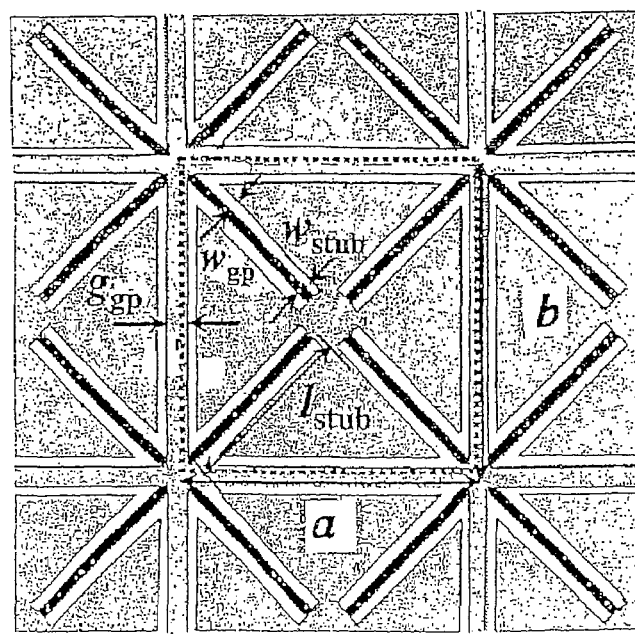

FIG. 13 sets FIG. 13 (A) and FIG. 13 (B). FIG. 13 (A) shows a conductor pattern of a unit cell of an upper-surface substrate 4, and FIG. 13 (B) shows a conductor pattern of a ground plane 3. FIG. 13 (B) particularly includes a parameter of each section. An oblique thin heavy line shows an electrically-equivalent parallel inductance which is formed when the upper-surface substrate 4 and the ground plane 3 are arranged in an upper side and a lower side with a space to compose a left-handed medium 1, and a part of the conductor pattern on the ground plane 3 is connected to a ground portion of the ground plane 3. Here, the electrically-equivalent parallel inductance is formed on a portion in the conductor pattern of the ground plane 3, which opposes to a brim of the conductor pattern of the upper-surface substrate 4.

Figure 14:
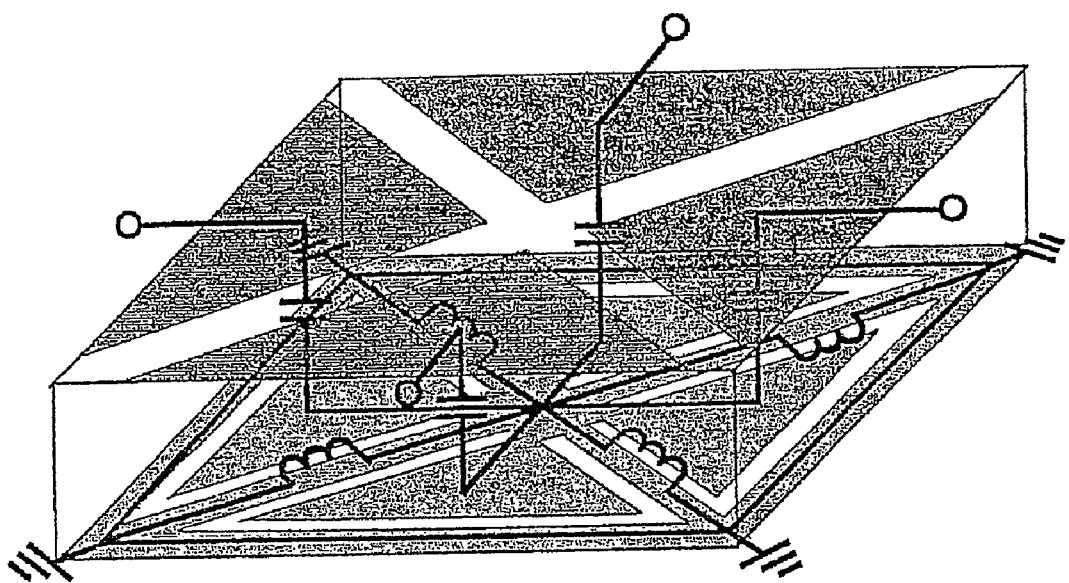
FIG. 14 shows a structure of an electrically equivalent circuit and a unit cell in a left-handed medium according to a second embodiment of the present invention.

In addition, capacitance is formed in between the conductor pattern 41 of the upper-surface substrate 4 and the conductor pattern 31 of the ground plane 3, and plays a role as a series capacitance in the medium. A left-handed medium in a first embodiment according to the present invention has the above described structure and an electrically equivalent circuit shown in the structure of the unit cell in FIG. 14. The structure shows a left-handed characteristic owing to an interaction between both the inductance and the capacitance.

Figure 15:
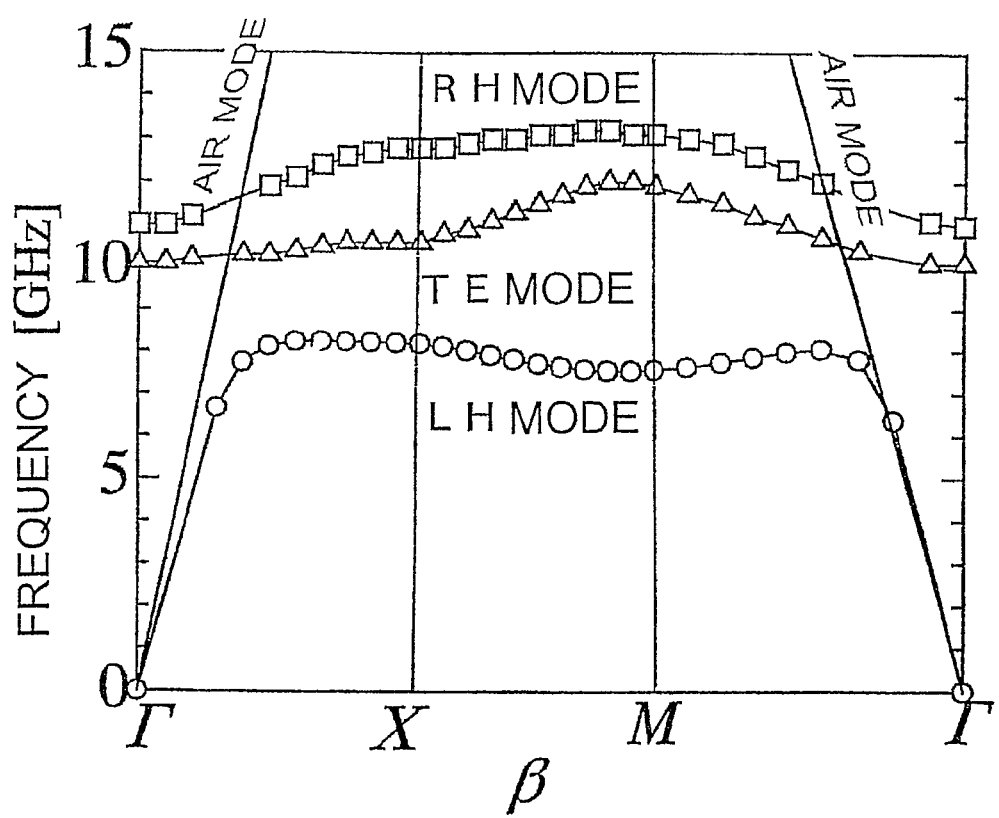
FIG. 15 shows a simulation result of a dispersion characteristic of a second embodiment according to the present invention.

A dispersion characteristic on boundaries formed by connecting Γ, X and M points in a Brillouin zone was numerically simulated on a value condition in Table 2 for parameters of each part in FIG. 13 (B). The result is shown in FIG. 15. A horizontal axis represents the Γ, X and M points, and a vertical axis represents a frequency. A mode of transmitting a wave with the lowest frequency out of the modes is in a range between 7.54 GHz and 8.24 GHz, and an LH mode has a negative gradient in the range. The fact shows the existence of a backward-wave having a negative group velocity. In other words, the fact proves that the medium shows a left-handed characteristic.

TABLE 2

| | |
|---|---|
| a | 4.4 mm |
| b | 5.0 mm |
| $w_{stub}$ | 0.1 mm |
| $l_{stub}$ | 3.1 mm |
| $w_{gp}$ | 0.2 mm |
| $g_{gp}$ | 0.4 mm |

Thus, the left-handed medium using no via according to the present invention can remarkably increase an integration degree of unit cells by giving scalability to the structure beyond the limitation of via density, because an operating frequency of the present medium can be freely varied by upsizing or downsizing the structure according to a scaling law. In addition, the left-handed medium has a merit of being capable of reducing a manufacturing cost, because the left-handed medium needs no via and a process for producing the via can be consequently omitted.

INDUSTRIAL APPLICABILITY

As described above, a left-handed medium using no via according to the present invention can be widely utilized as a component in a device such as an antenna for an ultrahigh-frequency radio wave, a focus lens for a sub-wavelength, a super-small resonator for use in communication, a filter and an oscillator.

The invention claimed is:

1. A left-handed medium which uses no via and includes a substrate having a conductor pattern of a plurality of unit cells formed on an upper surface and having a conductor pattern formed on a lower surface as a ground plane, wherein the conductor pattern on the upper surface of the substrate and the conductor pattern of the ground plane form capacitance in between the conductor patterns, and a part of the conductor pattern of the ground plane and a ground portion of the ground plane form an electrically-equivalent parallel inductance.

2. The left-handed medium using no via according to claim 1, wherein the conductor pattern of the unit cells on the upper surface of the substrate is formed of a rectangular metal patch, and the conductor pattern of the ground plane, which faces to the conductor pattern of the unit cells on the upper surface of the substrate, is formed of four triangular metal patches combined so that each triangular metal patch having two sides separated by a ground region and a part of the other side connected to a conductor is arranged so as to face each other at each vertex formed by the two sides which are separated by the ground region.

3. The left-handed medium using no via according to claim 2, wherein the conductor pattern of the upper-surface substrate and the conductor pattern of the ground plane form the capacitance in between the conductor patterns, and a part of the conductor pattern of the ground plane, which faces the brim of the conductor pattern of the upper-surface substrate, and a ground portion of the ground plane form an electrically-equivalent parallel inductance.

4. The left-handed medium using no via according to claim 1, wherein the conductor pattern of the unit cells on the upper surface of the substrate is formed of a rhombic metal patch, and the conductor pattern of the ground plane, which faces to the conductor pattern of the unit cells on the upper surface of the substrate, is formed of four triangular metal patches combined so that each triangular metal patch having a long side separated by a ground region and a vertex formed by the other two sides connected to a conductor is arranged so as to face each other at each vertex.

5. The left-handed medium using no via according to claim 4, wherein the conductor pattern of the upper-surface substrate and the conductor pattern of the ground plane form the capacitance in between the conductor patterns, and a part of the conductor pattern of the ground plane, which faces the brim of the conductor pattern of the upper-surface substrate, and a ground portion of the ground plane form an electrically-equivalent parallel inductance.

* * * * *